US012252140B2

(12) United States Patent
Hoshino et al.

(10) Patent No.: US 12,252,140 B2
(45) Date of Patent: Mar. 18, 2025

(54) ON-VEHICLE DEVICE AND COMMUNICATION SYSTEM

(71) Applicant: Hitachi Astemo, Ltd., Hitachinaka (JP)

(72) Inventors: Katsuhiro Hoshino, Hitachinaka (JP); Takaki Itaya, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 289 days.

(21) Appl. No.: 17/796,771

(22) PCT Filed: Dec. 18, 2020

(86) PCT No.: PCT/JP2020/047351
§ 371 (c)(1),
(2) Date: Aug. 1, 2022

(87) PCT Pub. No.: WO2021/157219
PCT Pub. Date: Aug. 12, 2021

(65) Prior Publication Data
US 2023/0078306 A1    Mar. 16, 2023

(30) Foreign Application Priority Data

Feb. 3, 2020 (JP) .................................. 2020-016528

(51) Int. Cl.
*B60W 50/14* (2020.01)
*B60W 50/02* (2012.01)

(52) U.S. Cl.
CPC ........ *B60W 50/0205* (2013.01); *B60W 50/14* (2013.01); *B60W 2510/081* (2013.01); *B60W 2756/10* (2020.02)

(58) Field of Classification Search
None
See application file for complete search history.

(56) References Cited

U.S. PATENT DOCUMENTS

| 8,548,669 B2* | 10/2013 | Naylor ............... G06Q 10/06 701/29.1 |
| 2014/0195080 A1* | 7/2014 | Lehmen ............... B60K 6/48 180/65.265 |

(Continued)

FOREIGN PATENT DOCUMENTS

| JP | 2016-109019 A | 6/2016 |
| JP | 2016-208620 A | 12/2016 |

(Continued)

OTHER PUBLICATIONS

International Search Report, PCT/JP2020/047351, Mar. 30, 2021, 2 pgs.

(Continued)

*Primary Examiner* — James M McPherson
(74) *Attorney, Agent, or Firm* — Volpe Koenig

(57) ABSTRACT

An abnormality of a component can be accurately detected. An on-vehicle device is an on-vehicle device that is mounted on a vehicle to communicate with a server. The on-vehicle device includes a first information generation unit that generates first information which is information on a state of a first component mounted on the vehicle by using an output of a sensor mounted on the vehicle, and an out-vehicle communication unit that transmits, to the server, the first information and second information which is information on a state of a second component which is a component different from the first component, and receives, from the server, a state signal indicating an abnormal state of the first component calculated by the server based on the first information and the second information.

8 Claims, 13 Drawing Sheets

(56) References Cited

U.S. PATENT DOCUMENTS

2017/0292250 A1  10/2017  Sato et al.
2021/0010581 A1* 1/2021  Fukuda ................ G01M 13/02

FOREIGN PATENT DOCUMENTS

JP        2018-157655  A     10/2018
JP        2019-162949  A     9/2019

OTHER PUBLICATIONS

Japanese Office Action issued on Jan. 24, 2023 for Japanese Patent Application No. 2021-575645.

* cited by examiner

FIG. 5

| | STRESS | NUMBER OF TIMES |
|---|---|---|
| MOTOR PORTION 1 | $\sigma 1\text{-}1$ | $N1\text{-}1$ |
| | $\sigma 1\text{-}2$ | $N1\text{-}2$ |
| | . | . |
| | $\sigma 1\text{-}n$ | $N1\text{-}n$ |
| MOTOR PORTION 2 | $\sigma 2\text{-}1$ | $N2\text{-}1$ |
| | $\sigma 2\text{-}2$ | $N2\text{-}2$ |
| | . | . |
| | $\sigma 2\text{-}n$ | $N2\text{-}n$ |
| . | . | . |
| . | . | . |
| MOTOR PORTION N | . | . |

| IDENTIFIER | FATIGUE LEVEL | | |
|---|---|---|---|
| | MOTOR | INVERTOR | · |
| abc001 | 0.01 | · | · |
| abc002 | 0.35 | · | · |
| abc003 | 0.21 | · | · |
| abc004 | 0.95 | · | · |
| abc005 | 0.68 | · | · |
| abc006 | 0.42 | · | · |
| · | · | · | · |

FIG. 11

| TYPE | SURGE VOLTAGE | COIL TEMPERATURE | ATMOSPHERIC PRESSURE | HUMIDITY | FEATURE VALUE |
|---|---|---|---|---|---|
| UNIT | V | °C | kPa | % | – |
| VALUE | 400 | 20 | 1024 | 50 | · |
| | 400 | 30 | 1024 | 50 | · |
| | 300 | 40 | 1024 | 50 | · |
| | · | · | · | · | · |

ON-VEHICLE DEVICE AND COMMUNICATION SYSTEM

TECHNICAL FIELD

The present invention relates to an on-vehicle device and a communication system.

BACKGROUND ART

A technique for detecting an abnormality of a component is required for safe and secure traveling by a vehicle. PTL 1 discloses a management system for a construction machine that manages a state of each machine body in a machine body group of the construction machine including at least one first machine body including a first information detection device that detects first information related to a machine body of the construction machine and a second information detection device that detects second information, and at least one second machine body including the first information detection device and not including the second information detection device, the management system including a machine body state diagnosis device that performs predictive diagnosis of a failure state related to second information of the second machine body based on correlation information between first information and second information obtained from the first machine body and first information of the second machine body.

CITATION LIST

Patent Literature

PTL 1: JP 2016-109019 A

SUMMARY OF INVENTION

Technical Problem

In the invention described in PTL 1, there is room for improvement in accuracy of the abnormality detection of the component.

Solution to Problem

An on-vehicle device according to a first aspect of the present invention is an on-vehicle device that is mounted on a vehicle to communicate with a server. The on-vehicle device includes a first information generation unit that generates first information which is information on a state of a first component mounted on the vehicle by using an output of a sensor mounted on the vehicle, and an out-vehicle communication unit that transmits, to the server, the first information and second information which is information on a state of a second component which is a component different from the first component, and receives, from the server, a state signal indicating an abnormal state of the first component calculated by the server based on the first information and the second information.

A communication system according to a second aspect of the present invention is a communication system that includes a server and an on-vehicle device mounted on a vehicle which are capable of communicating with each other. The on-vehicle device includes a first information generation unit that generates first information which is information on a state of a first component mounted on the vehicle by using an output of a sensor mounted on the vehicle, and an out-vehicle communication unit that transmits, to the server, the first information and second information which is information on a state of a second component which is a component different from the first component, the server includes a fatigue evaluation unit that calculates a state signal indicating an abnormal state of the first component based on the first information and the second information, and a server communication unit that transmits the state signal to the on-vehicle device, and the out-vehicle communication unit of the on-vehicle device receives the state signal.

An on-vehicle device according to a third aspect of the present invention is an on-vehicle device mounted on a vehicle. The on-vehicle device includes a first information generation unit that generates first information which is information on a state of a first component mounted on the vehicle by using an output of a sensor mounted on the vehicle, and an on-vehicle storage unit that stores accumulated values of fatigue levels of the first component. The on-vehicle storage unit further stores fatigue limit information with which an increase in the fatigue level of the first component is capable of being calculated by using the first information and second information which is information on a state of a second component which is a component different from the first component, and the on-vehicle device further includes a fatigue evaluation unit that calculates the increase in the fatigue level by using the first information, the second information, and the fatigue limit information, and determines that the first component is in an abnormal state when a sum of the accumulated values of the fatigue levels stored in the on-vehicle storage unit and the increase in the fatigue level exceeds a predetermined threshold value.

Advantageous Effects of Invention

According to the present invention, the abnormality of the component can be accurately detected.

BRIEF DESCRIPTION OF DRAWINGS

FIG. 5 is a diagram illustrating an example of stress information.

FIG. 7 is a diagram illustrating an example of a vehicle database.

FIG. 11 is a diagram illustrating an example of insulation information according to Modification Example 3.

DESCRIPTION OF EMBODIMENTS

First Embodiment—Hereinafter, a first embodiment of an arithmetic operation system will be described with reference to FIGS. 1 to 7. In the present embodiment, prior detection of fatigue fracture using a linear cumulative damage rule is targeted.

Figure 1:
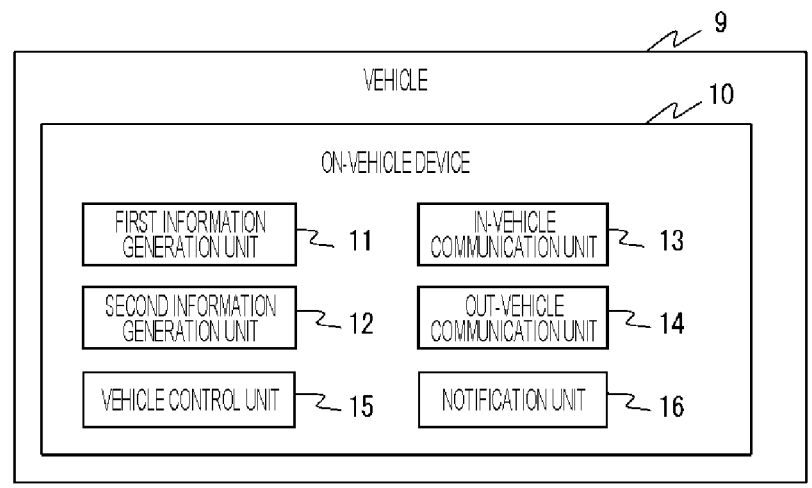
FIG. 1 is an overall configuration diagram of an arithmetic operation system according to a first embodiment.
Figure 1:
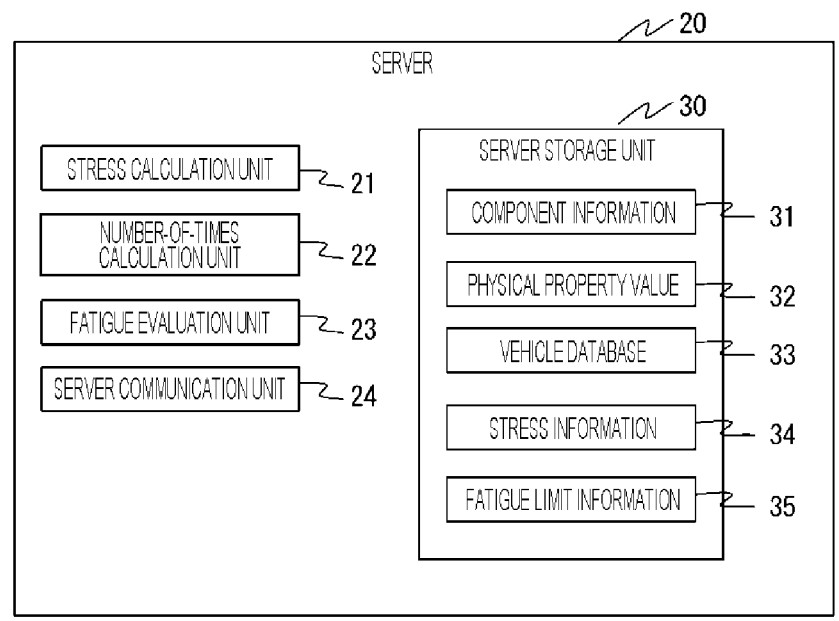

(Configuration) FIG. 1 is an overall configuration diagram of an arithmetic operation system S. The arithmetic operation system S includes an on-vehicle device 10 and a server 20. Although only one on-vehicle device 10 is illustrated in FIG. 1, a plurality of on-vehicle devices 10 may be included in the arithmetic operation system S. The on-vehicle device 10 is mounted on a vehicle 9. Hereinafter, the vehicle 9 on which the on-vehicle device 10 is mounted may be referred to as a "host vehicle" 9 in order to be distinguished from other vehicles.

The on-vehicle device 10 is, for example, an electronic control unit. The on-vehicle device 10 includes a first information generation unit 11, a second information generation unit 12, an in-vehicle communication unit 13, an out-vehicle communication unit 14, a vehicle control unit 15, and a notification unit 16.

The first information generation unit 11 generates first information to be described later. The second information generation unit 12 generates second information to be described later. The in-vehicle communication unit 13 communicates with another device mounted on the vehicle 9, for example, a sensor. The in-vehicle communication unit 13 is, for example, a communication interface compatible with a communication standard such as IEEE 802.3. The out-vehicle communication unit 14 communicates with a device outside the vehicle 9 such as the server 20. The out-vehicle communication unit 14 is, for example, a wireless communication module compatible with 4G or 5G. However, the out-vehicle communication unit 14 may directly communicate with the server 20, or may communicate with the server 20 by relaying one or a plurality of devices.

The vehicle control unit 15 performs automatic control of the vehicle 9. The on-vehicle device 10 includes a non-volatile on-vehicle storage unit (not illustrated), and the vehicle control unit 15 controls the vehicle 9 while referring to a high-precision map stored in the on-vehicle storage unit. However, the vehicle 9 can be operated not only by automatic control by the vehicle control unit 15 but also by an occupant of the vehicle 9. The notification unit 16 is, for example, a speaker or a liquid crystal display. The notification unit 16 notifies the occupant of the vehicle 9 that a component of the vehicle 9 is in a problematic state.

The first information generation unit 11, the second information generation unit 12, and the vehicle control unit 15 are implemented by a CPU (not illustrated) included in the on-vehicle device 10 loading a program stored in a ROM (not illustrated) in a RAM and executing the program. However, the first information generation unit 11, the second information generation unit 12, and the vehicle control unit 15 may be implemented by a field programmable gate array (FPGA) which is a rewritable logic circuit or an application specific integrated circuit (ASIC) which is an integrated circuit for specific applications.

The server 20 is one or two or more computers. The server 20 includes a stress calculation unit 21, a number-of-times calculation unit 22, a fatigue evaluation unit 23, a server communication unit 24, and a server storage unit 30.

The stress calculation unit 21 generates stress information 34 to be described later and stores the stress information in the server storage unit 30. The number-of-times calculation unit 22 generates fatigue limit information 35 to be described later and stores the fatigue limit information in the server storage unit 30. The fatigue evaluation unit 23 evaluates the fatigue of the component by using the first information and the second information received from the on-vehicle device. The stress calculation unit 21, the number-of-times calculation unit 22, and the fatigue evaluation unit 23 are implemented by a CPU (not illustrated) included in the server 20 loading a program stored in a ROM (not illustrated) in a RAM and executing the program. However, the stress calculation unit 21, the number-of-times calculation unit 22, and the fatigue evaluation unit 23 may be implemented by an FPGA which is a rewritable logic circuit or an ASIC.

The server storage unit 30 is a non-volatile storage device, for example, a hard disk drive. The server storage unit 30 stores component information 31, physical property values 32, a vehicle database 33, stress information 34, and fatigue limit information 35. The information stored in the server storage unit 30 will be described later.

Figure 2:
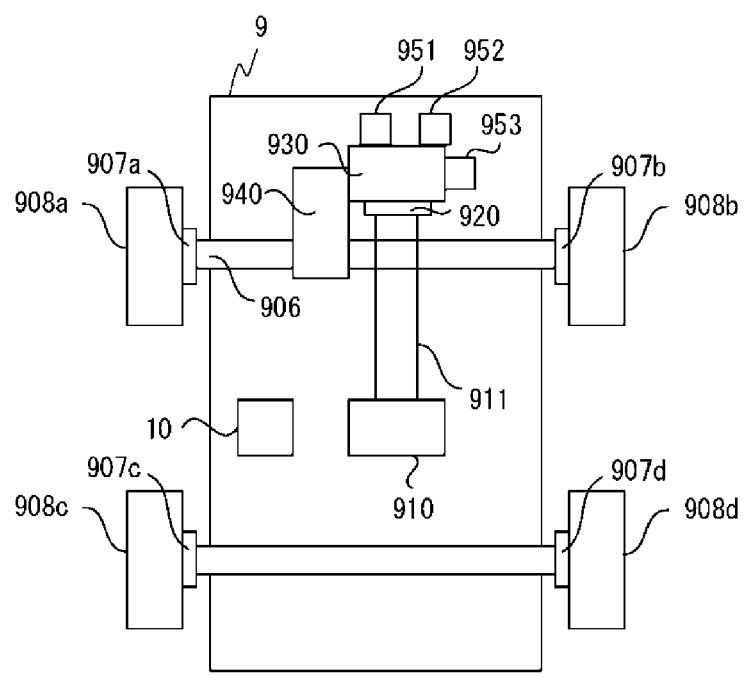
FIG. 2 is a mechanical configuration diagram of a vehicle.
Figure 3:
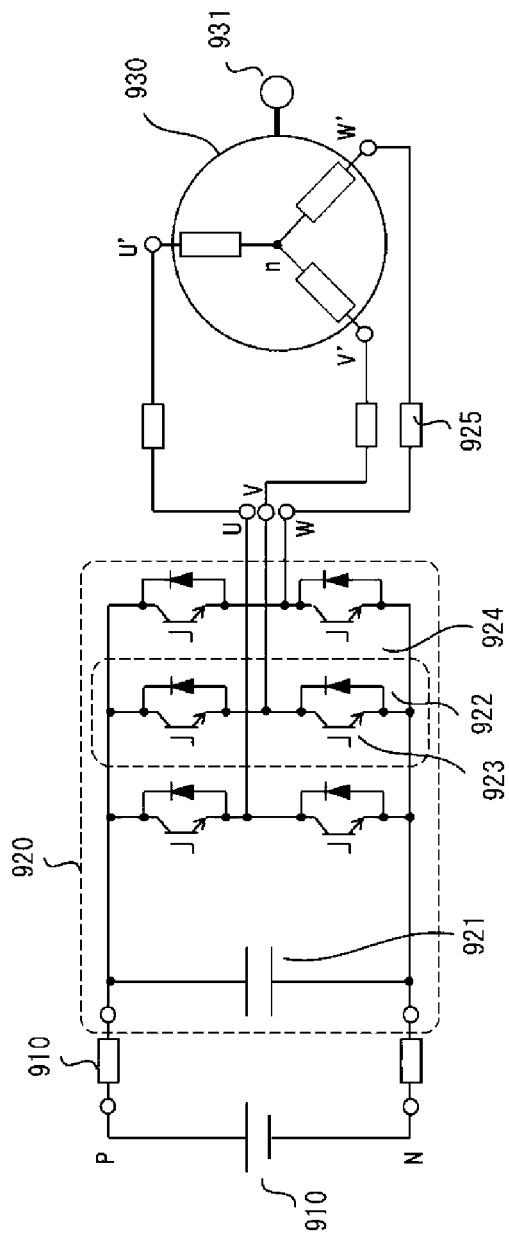
FIG. 3 is an electrical configuration diagram of the vehicle.

FIG. 2 is a mechanical configuration diagram of the vehicle 9, and FIG. 3 is an electrical configuration diagram of the vehicle 9. The vehicle 9 includes a battery 910, a DC power cable 911, an inverter 920, an AC power cable 925, a motor 930, a gearbox 940, a drive shaft 906, brake devices 907, wheels 908, a first accelerometer 951, a second accelerometer 952, and a third accelerometer 953. However, the wheels 908 include wheels 908a to 908d, and the brake devices 907 include brake devices 907a to 907d.

The battery 910 supplies power to the inverter 920 via the DC power cable 911. The inverter 920 constitutes a smoothing capacitor 921 that smooths a DC voltage applied by the battery 910 and a bridge circuit of each phase. A power module 922 includes two insulated gate bipolar transistors (IGBTs) 923 that function as switching elements of upper and lower arms, and diodes 924 provided in parallel with the IGBTs 923. The power module 922 performs a switching operation, converts DC power supplied from the battery 910 into AC power, and outputs the AC power to the motor 930 via the AC power cable 925. The motor 930 consumes power to generate rotational energy, and transmits the rotational energy to the gearbox 940 and the drive shaft 906 to rotate the wheels 908. The brake devices 907 are mounted on a distal end portion of the drive shaft 906 connected to the wheels 908.

The motor 930 is fixed to the vehicle 9 at a plurality of positions, and is fixed to the vehicle 9 at three positions in the present embodiment. The first accelerometer 951, the second accelerometer 952, and the third accelerometer 953 are installed at fixed positions, respectively. Hereinafter, the first accelerometer 951, the second accelerometer 952, and the third accelerometer 953 are also collectively referred to as accelerometers 950. The accelerometers 950 output accelerations for XYZ axes based on the vehicle 9. As a speed of the vehicle 9, the speed of the vehicle 9 is calculated by detecting rotation speeds of wheel speed sensors attached to the brake devices 907a to 907d connected to the drive shaft 906 and multiplying the rotation speeds of the wheel speed sensors attached to the brake devices 907a to 907d by a predetermined coefficient.

Figure 4:
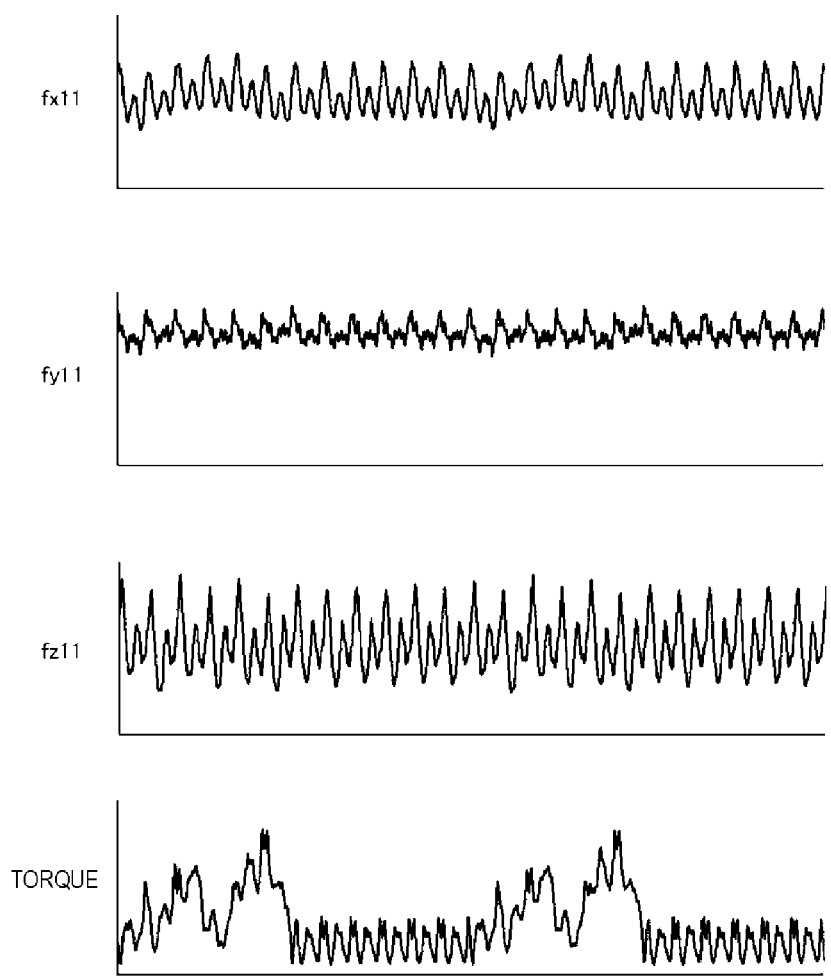
FIG. 4 is a conceptual diagram illustrating time-series changes in output and torque reaction force of an accelerometer.

FIG. 4 is a conceptual diagram illustrating time-series changes in an output and a torque reaction force of the accelerometer. In each of four graphs illustrated in FIG. 4, a horizontal axis represents time, a vertical axis on upper three graphs represents an acceleration of each axis of the first accelerometer 951, and a vertical axis on the lowest graph represents a torque reaction force input to the drive shaft 906. More specifically, the three graphs from the top are, in order, an acceleration fx11 of the first accelerometer 951 in an X-axis direction, an acceleration fy11 of the first accelerometer 951 in a Y-axis direction, and an acceleration fz11 of the first accelerometer 951 in a Z-axis direction.

(Evaluation of fatigue fracture) The energy received by the motor 930 from a vehicle body is calculated from the outputs of the accelerometers 950, and the energy received by the motor 930 via the drive shaft 906 is indirectly calculated from information on the vehicle. Specifically, the energy received by the motor 930 via the drive shaft 906 can be calculated from information on a weight of the vehicle 9, a frontal projected area, an air resistance coefficient, a total reduction ratio of a speed reducer, the rigidity of the drive shaft, a radius of the wheel, and a force acting on the traveling vehicle 9 by using the following Equations (1) to (13). Among the information, the rotation speed of the drive shaft 906 of the motor 930, the radius of the wheel provided in the vehicle 9, and a traveling speed of the vehicle 9 are variable values, and values stored in a ROM (not illustrated) are used as other values.

The torque reaction force received by the drive shaft 906 of the motor 930 due to the twist of the drive shaft 906 can also be calculated from an obtained phase difference by using a value of a rotation angle sensor attached to the drive shaft 906 of the motor 930 and values converted from the rotation speeds of the wheel speed sensors attached to the brake devices 907a to 907d.

[Math. 1]
$$F_V = F_W + F_B + R_t \qquad \text{Equation 1}$$

[Math. 2]
$$R_t = R_a + R_r + R_e + R_c \qquad \text{Equation 2}$$

[Math. 3]
$$R_a = \frac{1}{2} * \rho * C_d * A_V * V_V^2 \qquad \text{Equation 3}$$

[Math. 4]
$$R_r = \mu * M_V * g * \cos\theta \qquad \text{Equation 4}$$

[Math. 5]
$$R_e = M_V * g * \sin\theta \qquad \text{Equation 5}$$

[Math. 6]
$$R_c = (M + M_V)\alpha \qquad \text{Equation 6}$$

[Math. 7]
$$F_W = \frac{T_W}{R_W} \qquad \text{Equation 7}$$

[Math. 8]
$$T_W = T_M * R_G \qquad \text{Equation 8}$$

[Math. 9]
$$J_W * \dot{\omega}_W = T_W - S_D\left(\theta_W - \frac{\theta_M}{R_G}\right) \qquad \text{Equation 9}$$

[Math. 10]
$$J_M * \dot{\omega}_M = T_M - S_D(\theta_M - R_G\theta_W) \qquad \text{Equation 10}$$

[Math. 11]
$$\theta_W = \int \omega_W dt \qquad \text{Equation 11}$$

[Math. 12]
$$\theta_M = \int \omega_M dt \qquad \text{Equation 12}$$

[Math. 13]
$$T_D = S_D(\theta_M - R_G\theta_W) \qquad \text{Equation 13}$$

In Equations (1) to (13), $F_V$ is a force acting on the traveling vehicle, $V_V$ is a vehicle speed, $\alpha_V$ is an acceleration, $M_V$ is a vehicle weight, $M_i$ is an equivalent inertia mass of a drive system rotation unit, $A_V$ is a frontal projected area, $R_G$ is a total reduction ratio, $F_W$ is a wheel axle propulsion force, $T_W$ is a wheel axle torque, $J_W$ is a vehicle inertia in terms of a wheel axle, $\omega_W$ is a rotation speed of the wheel, $\theta_W$ is a rotation angle of the wheel, $R_W$ is a radius of the wheel, $F_B$ is a braking force generated by a mechanical brake, $S_D$ is rigidity of the drive shaft, $T_D$ is a torsional torque of the drive shaft, $T_M$ is a motor axis torque, $J_M$ is a motor side inertia, $\omega_M$ is a rotation speed of the motor, $\theta_M$ is a rotation angle of the motor, $R_t$ is a traveling resistance, $R_a$ is an air resistance, $C_d$ is an air resistance coefficient, $\rho$ is an air density, $R_r$ is a rolling resistance, $\mu$ is a rolling resistance coefficient, $\theta$ is a slope gradient, g is a gravitational acceleration, $R_e$ is a gradient resistance, and $R_c$ is an acceleration resistance.

Hereinafter, a force received by the motor 930 from the vehicle body 9, that is, outputs of the three accelerometers 950 will be referred to as "first information", and a model of the vehicle 9 on which the motor is mounted, a product number information of the component other than the motor 930, a radius of the wheel, ae speed of the vehicle, a rotation speed of the wheel, and a DC voltage value of the battery will be referred to as "second information". The first information generation unit 11 generates the first information by using the outputs of the accelerometers 950. The second information generation unit 12 generates the second information by using an output of an air pressure sensor of the wheel, a speed of the vehicle 9, and rotation speed outputs of the wheel speed sensors attached to the brake devices 907A to 907D. In addition to the above information, a sensor dedicated to the vehicle 9 may be provided for weather conditions such as temperature and humidity and gradient information, or information on a zone may be aggregated and used in the server 20.

As described above, the server storage unit 30 of the server 20 stores the component information 31, the physical property values 32, the vehicle database 33, the stress information 34, and the fatigue limit information 35. The component information 31 is information on shapes of various components mounted on the vehicle 9 and materials for parts of the components. The physical property values 32 are various mechanical and electrical characteristic values for each material, for example, breaking strength and insulation strength. The model of the vehicle 9 and the product number of the component other than the motor 930 are transmitted as a part of the second information, and are collated with the component information of the server storage unit 30.

The stress calculation unit 21 of the server 20 calculates a stress applied to the motor 930 by simulation by using Equations (1) to (12) based on the first information and the second information, and stores the calculated stress as stress information 34 of each unit of the motor 930. The number-of-times calculation unit 22 of the server 20 calculates the number of times of repetitions until fatigue fracture occurs for each stress based on physical properties of the material of the motor 930, and stores the number of times of repetitions as the fatigue limit information 35.

FIG. 5 is a diagram illustrating an example of the stress information 34. As illustrated in FIG. 5, the stress information 34 stores the stress and the number of times for each structural part of the motor.

Figure 6:
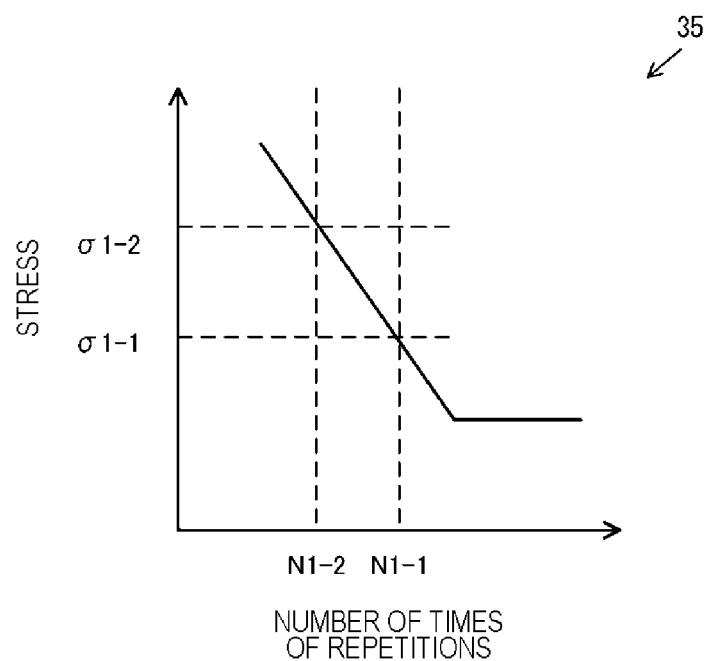
FIG. 6 is a conceptual diagram of fatigue limit information.

FIG. 6 is a conceptual diagram of the fatigue limit information 35. The fatigue limit information 35 is prepared for each portion such as an attachment portion between the motor and the vehicle. FIG. 6 illustrates one portion of the motor. In FIG. 6, although the fatigue limit information 35 is illustrated in a diagram for easy understanding, the fatigue limit information 35 may be expressed by a table or an equation. In FIG. 6, a horizontal axis represents the number of times of repetitions, and the vertical axis represents the stress. As the stress becomes larger, the number of times of repetitions until fatigue fracture occurs tends to become smaller. The example illustrated in FIG. 6 illustrates that the fatigue fracture occurs when the number of times of repetitions of a stress $\sigma 1-1$ reaches $N1-1$ times. As illustrated in FIG. 6, in a case where the stress is less than a fatigue limit, the fatigue fracture may not occur, or the modified Miner's rule or the like may be adopted, and the stress less than the fatigue limit may influence the fatigue fracture.

FIG. 7 is a diagram illustrating an example of the vehicle database 33. The vehicle database 33 stores an identification number of the vehicle and accumulated values of fatigue levels for each component. In the example illustrated in FIG. 7, although only fatigue levels of the motor and the inverter are described, the components are not limited to the motor and the inverter, and various components mounted on the vehicle are targeted.

Upon receiving the first information 41 and the second information 42 from the on-vehicle device 10, the fatigue evaluation unit 23 first calculates a stress while referring to the stress information 34. Subsequently, the fatigue evaluation unit 23 calculates an increased value in the fatigue level while referring to the fatigue limit information 35. The fatigue evaluation unit 23 adds the calculated increased value in the fatigue level to the fatigue level recorded in the vehicle database 33 and determines whether or not the fatigue level exceeds "1.0". In a case where it is determined that the total fatigue level exceeds "1.0", the fatigue evaluation unit 23 transmits a signal for calling attention to the on-vehicle device 10 that has transmitted the first information 41 and the second information 42. In a case where it is determined that the total fatigue level is equal to or less than "1.0", the fatigue evaluation unit 23 transmits a signal indicating that there is no problem with traveling to the on-vehicle device 10 that has transmitted the first information 41 and the second information 42.

Figure 8:
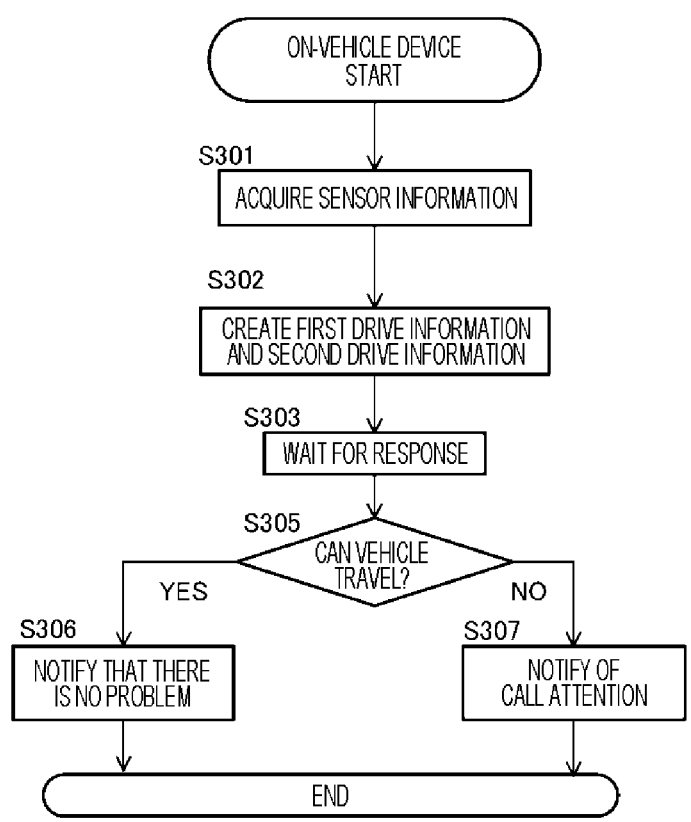
FIG. 8 is a flowchart illustrating an operation of an on-vehicle device.

(Flowchart) FIG. 8 is a flowchart illustrating an operation of the on-vehicle device 10. The on-vehicle device 10 executes the processing illustrated in FIG. 8 at a predetermined timing, for example, at the time of activation of the on-vehicle device 10 or every one hour. In step S301, the first information generation unit 11 and the second information generation unit 12 acquire sensor information. In subsequent step S302, the first information generation unit 11 and the second information generation unit 12 generate the first information and the second information. It is desirable that the first information and the second information transmitted in step S302 include information of the entire period in which the vehicle 9 is operating in total.

Thus, for example, when the execution of step S302 is performed once per hour, it is desirable that the first information and the second information corresponding to past sensor information for one hour are collectively transmitted. The information transmitted in step S302 is, for example, data of a time history in which the first information is detection values (fx11, fy11, fz11), (fx12, fy12, fz12), and (fx13, fy13, fz13) of three acceleration sensors and the second information is (fx21, fy21, yz21). A power spectral density at a position of each acceleration sensor in a certain time may be calculated and transmitted instead of time-series data of the detection value of each acceleration sensor.

In subsequent step S303, the out-vehicle communication unit 14 transmits the first information and the second information created in step S302 to the server 20. In subsequent step S303, the out-vehicle communication unit 14 waits for a response from the server 20, and upon receiving the response, the processing proceeds to step S305. In step S305, the notification unit 16 determines whether or not the host vehicle 9 can travel, proceeds to step S306 in a case where it is determined that the host vehicle can travel, and proceeds to step S307 in a case where it is determined that the host vehicle cannot travel. For example, the notification unit 16 proceeds to step S306 in a case where the response of the server 20 is a signal indicating that there is no problem with traveling, and proceeds to step S307 in a case where the response of the server 20 is a signal for calling attention.

In step S306, the notification unit 16 outputs a notification indicating that there is no problem, and ends the processing illustrated in FIG. 8. In step S307, the notification unit 16 notifies that there is a possibility that a problem occurs in traveling, and ends the processing illustrated in FIG. 8. In step S307, in a case where the vehicle control unit 15 controls the vehicle 9, a traveling state of the vehicle may be changed by transitioning to a degeneration driving mode or the like.

Figure 9:
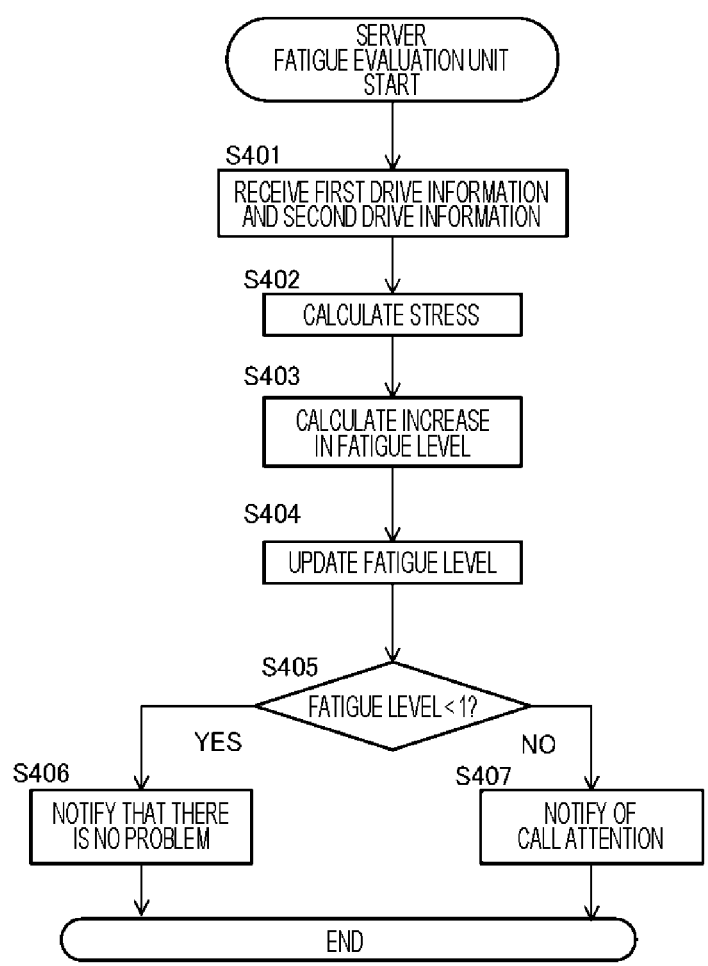
FIG. 9 is a flowchart illustrating an operation of a server.

FIG. 9 is a flowchart illustrating an operation of the server 20. Upon receiving the communication from the on-vehicle device 10, the server 20 starts the processing illustrated in FIG. 9. First, in step S401, the server communication unit 24 of the server 20 receives the first information and the second information from the on-vehicle device 10. However, in this step, an identifier for identifying the vehicle on which the on-vehicle device 10 is mounted and a name of the component to be diagnosed may be received together. In subsequent step S402, the fatigue evaluation unit 23 calculates stresses corresponding to the first information and the second information received in step S401 while referring to the stress information 34. In a case where there are a plurality of combinations of the first information and the second information received in step S401, the stresses are calculated for all the combinations in step S402.

In subsequent step S403, the fatigue evaluation unit 23 calculates the increase in the fatigue level due to the stress calculated in step S402 while referring to the fatigue limit information 35. For example, it is assumed that there is only one combination of the first information and the second information received in step S401 and the stress corresponding to the combination is specified as "σ1" while referring to the stress information 34. In this case, in a case where the number of times corresponding to the stress "σ1" in the fatigue limit information 35 is "1000" and the number of times of the combination received in step S401 is "10", the increase in the fatigue level is a value obtained by dividing "10" by "1000", that is, "0.01".

In subsequent step S404, the fatigue evaluation unit 23 reads the fatigue level of the vehicle that has transmitted the first information and the like from the vehicle database 33, and updates the fatigue level by adding the value calculated in step S403. The specification of the vehicle in this step uses, for example, the identifier of the vehicle received together with the first information and the second information in step S401. In this step, the specification of the component in this step uses the name of the component to be diagnosed in a case where the component to be diagnosed is determined in advance and the name of the component received in step S401 in a case where the component to be diagnosed is not determined in advance.

In step S404, for example, the identifier of the vehicle is specified as "abc002", and "0.01" which is the increase calculated in step S403 is added to "0.35" illustrated in FIG. 7 and the fatigue level is updated to "0.36". In subsequent step S405, the fatigue evaluation unit 23 determines whether or not the fatigue level updated in step S404 is smaller than "1" which is a predetermined threshold value, proceeds to step S406 in a case where it is determined that the fatigue level is smaller than "1", and proceeds to step S407 in a case where it is determined that the fatigue level is equal to or greater than "1". In step S406, the fatigue evaluation unit 23 notifies that there is no problem with the vehicle, and ends the processing illustrated in FIG. 9. In step S07, the fatigue evaluation unit 23 notifies the vehicle of the call attention and ends the processing illustrated in FIG. 9.

According to the aforementioned first embodiment, the following advantageous effects are obtained.

(1) The on-vehicle device 10 is mounted on the vehicle 9 to communicate with the server 20. The on-vehicle device 10 includes the first information generation unit 11 that generates the first information which is the information on the state of the motor 904 which is the component mounted on the vehicle 9 by using the output of the accelerometer 950 which is the sensor mounted on the vehicle 9, and the out-vehicle communication unit 14 that transmits, to the server 20, the first information and the second information which is the information on the state of the drive shaft 906 which is the component different from the motor 904, and receives, from the server 20, the state signal indicating the abnormal state of the first component calculated by the server 20 based on the first information and the second information. Thus, the abnormality of the first component can be accurately detected.

(2) The on-vehicle device 10 includes the vehicle control unit 15 that changes the traveling state of the vehicle 9 based on the state signal received by the out-vehicle communication unit 14. It is possible to take safety measures such as reducing the speed of the vehicle 9 when the abnormality is detected in the component.

(3) The on-vehicle device 10 includes the notification unit 16 that notifies an occupant of the vehicle 9 of the state signal received by the out-vehicle communication unit 14. Thus, the optimum control of the vehicle 9 can be left to the occupant.

(4) The first component is the motor 904. The first information is the output of the accelerometer 950 provided at the connection portion between the motor 904 and the vehicle 9. The second information includes the rotation speed of the drive shaft 906 mechanically connected to the motor 904 directly or indirectly.

(5) The first component is the motor 904, and the first information is the voltage value applied to the coil of the motor 904. The server 20 calculates the abnormal state of the first component by further using the atmospheric pressure in addition to the first information and the second information.

(6) The arithmetic operation system S includes the server 20 and the on-vehicle device 10 mounted on the vehicle 9 which are capable of communicating with each other. The on-vehicle device 10 includes the first information generation unit 11 that generates the first information which is the information on the state of the motor 904 which is the component mounted on the vehicle 9, and the out-vehicle communication unit 14 that transmits, to the server 20, the first information and the second information which is the information on the state of the drive shaft 906. The server 20 includes the fatigue evaluation unit 23 that calculates the state signal indicating the abnormal state of the first component based on the first information and the second information, and the server communication unit 24 that transmits the state signal to the on-vehicle device 10. The out-vehicle communication unit 14 of the on-vehicle device 10 receives the state signal.

(7) The server 20 includes the server storage unit 30 that stores the vehicle database 33 which stores the accumulated values of the fatigue levels of the first component. The server storage unit 30 further stores the fatigue limit information 35 with which the increase in the fatigue level of the first component is capable of being calculated by using the first information and the second information. The fatigue evaluation unit 23 of the server 20 calculates the increase in the fatigue level by using the first information and the second information received from the on-vehicle device 10 and the fatigue limit information 35 stored in the server storage unit 30, and determines that the first component is in an abnormal state when a sum of the accumulated values of the fatigue levels stored in the server storage unit 30 and the increase in the fatigue level exceeds the predetermined threshold value.

(Modification Example 1) The server 20 includes the stress calculation unit 21 and the number-of-times calculation unit 22, and the server storage unit 30 includes the component information 31 and the physical property values 32. However, an arithmetic operation device or an operator other than the on-vehicle device 10 or the server 20 may create the stress information 34 and the fatigue limit information 35 and may store the stress information and the fatigue limit information in the server storage unit 30. In this case, the server 20 may not include the stress calculation unit 21 and the number-of-times calculation unit 22, and the component information 31 and the physical property values 32 may not be stored in the server storage unit 30.

(Modification Example 2) In step S306 of FIG. 8, the notification unit 16 may not perform a special output. That is, the notification unit 16 may not perform an operation in a case where the abnormality is not detected. In a case where the vehicle control unit 15 operates, the notification unit 16 may not perform the processing in step S307 in FIG. 8. That is, in step S307, at least one of the notification unit 16 and the vehicle control unit 15 may operate.

(Modification Example 3) The arithmetic operation system may target insulation fracture that is electrical fatigue. In the present modification example, the server 20 further includes an insulation calculation unit 25, and insulation information 36 is further stored in the server storage unit 30. In the present modification example, although it has been described that the insulation fracture is detected instead of the fatigue fracture, the arithmetic operation system may detect the insulation fracture in addition to the fatigue fracture.

The insulation fracture in the coil of the motor 930 is influenced by an impedance of the motor 930, a temperature of the coil of the motor 930, a DC voltage of the battery 910, a carrier frequency of the inverter 920, an impedance of the AC power cable 925, a voltage change width of the battery 910, an atmospheric pressure, and humidity. The insulation fracture in the coil of the motor 930 occurs due to a decrease in a thickness of an enamel coating of an enameled wire.

The coil temperature of the motor 930 and the impedance of the motor 930 are also referred to as "first information on insulation fracture", and the detection value of the DC voltage sensor of the battery 910 or the detection value of the DC voltage sensor of the inverter 920, the carrier frequency of the inverter 920, and the impedance of the AC power cable 925 are also referred to as "second information on insulation fracture". Information on the atmospheric pressure and the humidity may be implemented by adding a sensor to the vehicle 9, or may be used by transmitting a value observed by a nearby base station where the host vehicle is traveling to the server 20.

The DC voltage of the battery 910 changes depending on a state of charge (SOC) of the battery 910 and an internal resistance of the battery 910. Thus, an amplitude of a voltage pulse waveform of a voltage $V_{UN}$ between a terminal U of the inverter 920 and a reference potential N of the battery 910 illustrated in FIG. 2 matches the voltage of the battery 910 and $V_{PN}$ as illustrated in an upper part of FIG. 10. In a case where the SOC is low, the amplitude of the voltage pulse is low, and in a case where the SOC is high, the amplitude of the voltage pulse is high. Thus, even though a fundamental wave component of the voltage applied by the inverter is the same, a pulse waveform of the voltage applied by the inverter differs depending on the SOC of the battery 910.

Terminals U, V, and W on an AC side of the inverter 920 are connected to terminals U', V', and W' on the motor 930 side via the AC power cable 925. At this time, since the value of the impedance of the AC power cable 925 and the value of the impedance of the motor 930 are greatly different, the voltage pulse is reflected at the terminals U', V', and W' of the motor 930. That is, a voltage jump occurs at the terminals U', V', and W' of the motor 930 at the time of turn-on and turn-off, and this phenomenon is referred to as a surge voltage of the inverter.

Figure 10:
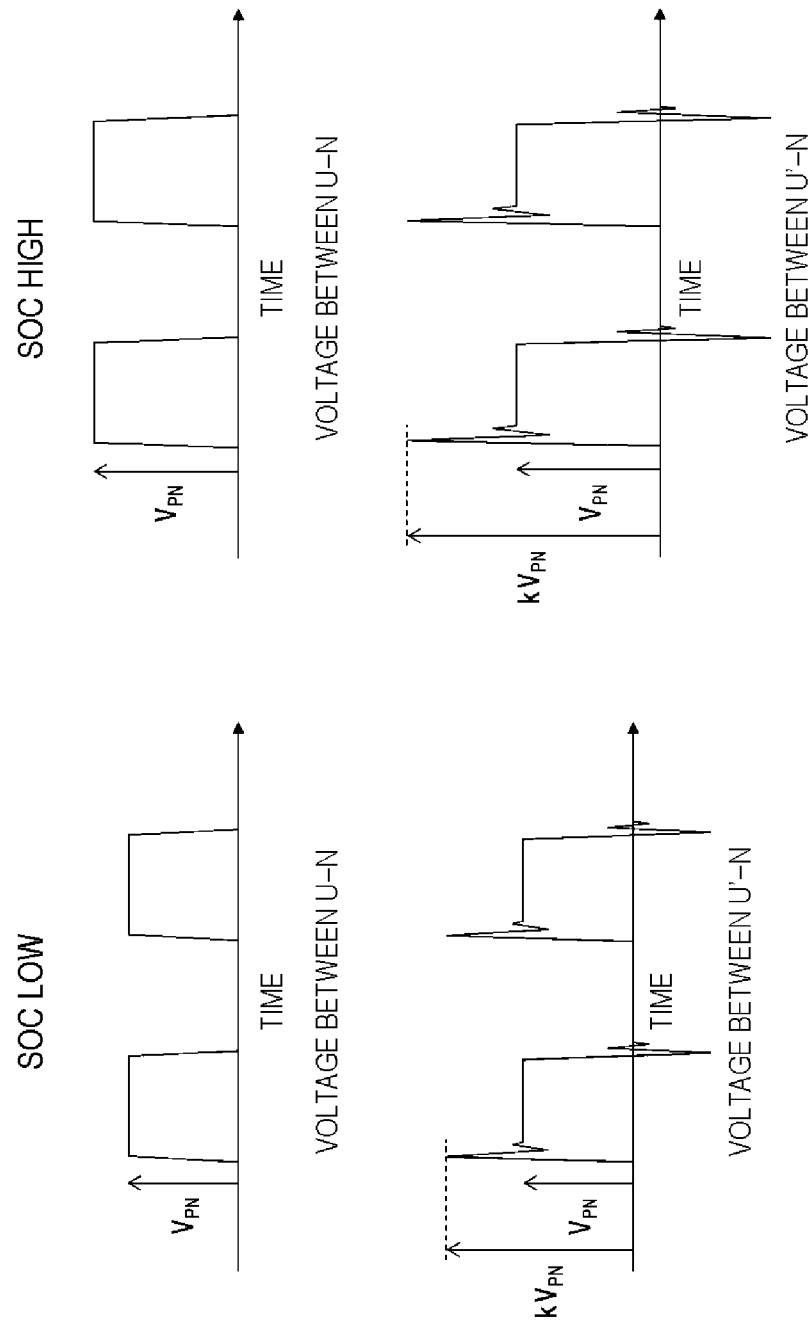
FIG. 10 is a diagram illustrating an example of voltage pulse waveforms of a voltage $V_{UN}$ and a voltage $V_{U'N}$ in Modification Example 3.

FIG. 10 illustrates a voltage pulse waveform of the voltage $V_{UN}$ between the terminal U of the inverter 920 and the reference potential N of the battery 910 and a voltage pulse waveform of the voltage $V_{U'N}$ between the terminal U' of the motor 930 and the reference potential N of the battery 910. At the terminals U', V', and W' of the motor 930, a voltage of k times the voltage amplitude of the battery 910 is instantaneously applied at the time of turn-on and turn-off by the reflection of the voltage pulse. At this time, a value of k≥1 is obtained.

The insulation fracture of the motor 930 due to aging deterioration progresses under the influence of the deterioration due to the temperature of the enamel coating of the enameled wire which is the material of the coil of the motor 930, a change in a partial discharge starting voltage due to the atmospheric pressure, a coefficient k of a surge voltage due to mismatch between the impedance of the motor 930 and the impedance of the AC power cable, the number of times of application of the surge voltage determined by the carrier frequency of the inverter 920, and the DC voltage of the battery 910. The enamel coating of the enamel wire is eroded by the surge voltage of the inverter 920, the thickness is reduced, and the insulation fracture occurs.

The insulation calculation unit 25 of the server 20 acquires, as the first information, the impedance of the motor 930 and the temperature of the coil of the motor 930. The insulation calculation unit 25 acquires the DC voltage of the battery 910, the carrier frequency of the inverter 920, the impedance of the AC power cable 925 as the second information, and the atmospheric pressure and the humidity as the external information. The insulation calculation unit 25 calculates the number of times until coil insulation under each condition occurs by using simulation.

The insulation calculation unit 25 records, as a feature of the condition, a reciprocal of the number of times in the insulation information 36. For example, when the combination of the impedance of the motor 930, the temperature of the coil of the motor 930, the DC voltage of the battery 910, the carrier frequency of the inverter 920, the impedance of the AC power cable 925, and the atmospheric pressure and the humidity as the external information occurs 100 times, in a case where the coil of the motor 904 causes the insulation fracture, a feature of the combination is ¹⁄₁₀₀, that is, "0.01".

The thickness of the enamel coating of the enameled wire constituting the coil of the motor 930 may be used as the feature, and a failure may be determined in a case where the thickness of the enamel coating of the enameled wire constituting the coil of the motor 930 is equal to or less than a certain threshold value.

FIG. 11 is a diagram illustrating an example of the insulation information 36. In the insulation information 36, the feature calculated by the insulation calculation unit 25 is stored for each combination of the voltage change width of the battery 901, the impedance of the power cable 902, and the atmospheric pressure.

In the present modification example, the vehicle database 33 stores the features accumulated so far instead of the fatigue level.

The first information generation unit 11 transmits, as the first information of the motor 930, the impedance of the motor 930 and the detected temperature of the temperature sensor attached to the coil of the motor 930 to the server 20. The second information generation unit 12 measures the impedance of the AC power cable 925 by using the voltmeter incorporated in the battery 910, the voltage of the battery 901 incorporated in the inverter 920, and the carrier frequency of the inverter 903 or reads the known impedance of the AC power cable 925 from a ROM (not illustrated) or the like, and transmits, as the second information on the insulation fracture, the impedance to the server 20.

The fatigue evaluation unit 23 of the server 20 that has received the first information and the second information acquires the feature while referring to the insulation information 36, and adds the acquired feature to the feature stored in the vehicle database 33. The server 20 notifies the on-vehicle device 10 of the call attention when this value is equal to or greater than 1, and notifies that there is no problem when this value is less than 1.

According to Modification Example 3, the electrical fatigue can be detected.

(Modification Example 4) The fatigue evaluation unit 23 of the server 20 may change a predetermined threshold value in the evaluation of the fatigue level. Specifically, the fatigue evaluation unit 23 may change the threshold value to be compared in step S405 from "1" to another value such as "1.2" or "0.8" by using the second information. For example, in a case where it is confirmed that deterioration of a target to be diagnosed is fast when the target to be diagnosed is used in a zone with a high altitude, that is, a zone with a low atmospheric pressure for a long period, the threshold value is changed from "1" to a value less than 1 based on the information on the atmospheric pressure included in the second information. The specific value is specified by referring to a database (not illustrated) created in advance and stored in the server 20. This database (not illustrated) can be created by collecting a large number of comparison cases between an actual degree of deterioration of the component in a periodic inspection of the vehicle and a degree of deterioration estimated from the first information and the second information on the vehicle so far.

Figure 12:
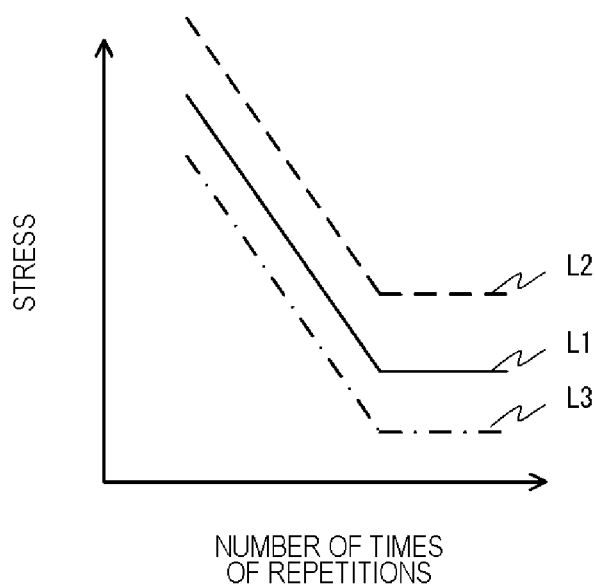
FIG. 12 is a conceptual diagram of threshold value change processing of a fatigue evaluation unit 23 in Modification Example 4.

FIG. 12 is a conceptual diagram of processing of changing the threshold value by the fatigue evaluation unit 23. In FIG. 12, reference sign L1 denotes an initial threshold value, that is, "1", reference sign L2 denotes an increased threshold value, that is, "1.2", and reference sign L3 denotes a decreased threshold value, that is, "0.8".

According to Modification Example 4, the following advantageous effects are obtained.

(8) The fatigue evaluation unit 23 of the server 20 changes the predetermined threshold value based on the second information. Thus, the abnormality of the first component can be detected more accurately.

Second Embodiment—A second embodiment of the arithmetic operation system will be described with reference to FIG. 13. In the following description, the same components as those in the first embodiment are assigned by the same reference signs, and differences will be mainly described. Points not particularly described are the same as those in the first embodiment. The present embodiment is different from the first embodiment mainly in that the processing is completed inside the on-vehicle device.

Figure 13:
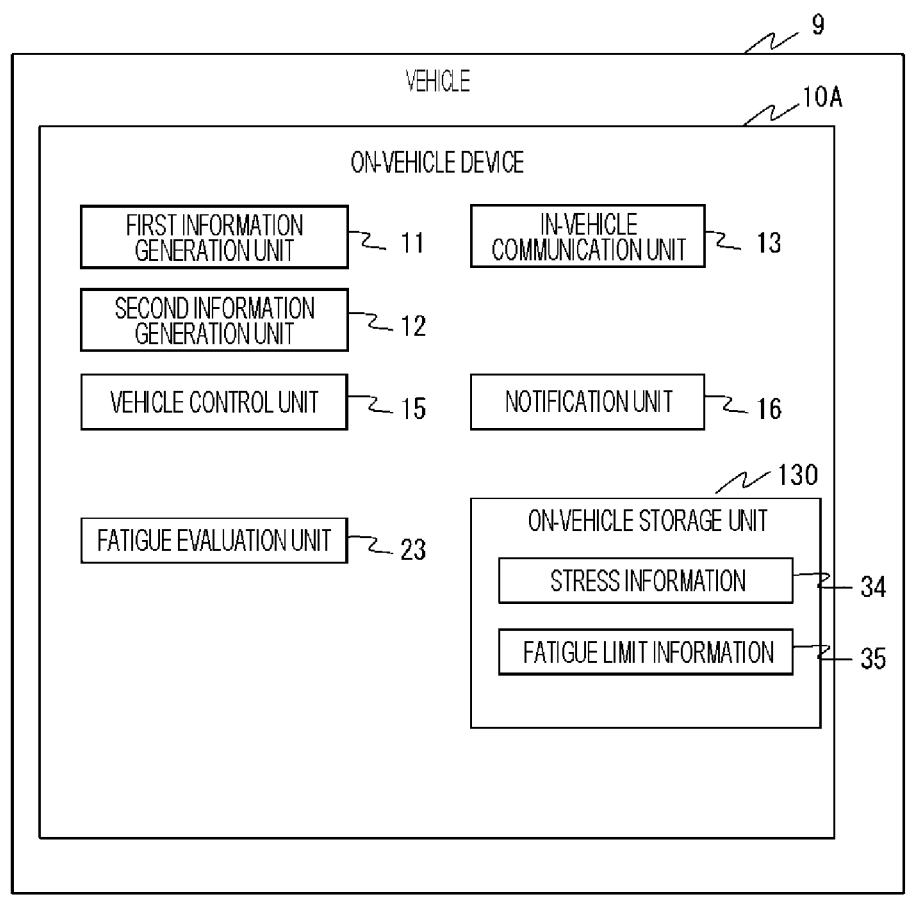
FIG. 13 is a configuration diagram of an on-vehicle device according to a second embodiment.

FIG. 13 is a configuration diagram of an on-vehicle device 10A according to the second embodiment. The on-vehicle device 10A includes a fatigue evaluation unit 23 and an on-vehicle storage unit 130 in addition to the configuration in the first embodiment. The on-vehicle storage unit 130 stores stress information 34 and fatigue limit information 35. However, the on-vehicle storage unit 130 also stores information on the fatigue level of the component of the vehicle 9. The fatigue evaluation unit 23 has the same function as the fatigue evaluation unit 23 included in the server 20 in the first embodiment. The on-vehicle storage unit 130 is a non-volatile storage device, for example, a flash memory. The stress information 34 and the fatigue limit information 35 are similar to the information having the same name stored in the server storage unit 30 in the first embodiment. In the present embodiment, the on-vehicle device 10A may not include the out-vehicle communication unit 14.

In the present embodiment, the on-vehicle device 10A performs both the processing of FIGS. 8 and 9 in the first embodiment. That is, first, the sensor information is acquired (S301), and the first information generation unit 11 and the second information generation unit 12 generate the first information and the second information, respectively (S302). Subsequently, the fatigue evaluation unit 23 calculates the stress and updates the fatigue level stored in the on-vehicle storage unit 130 (S402 to S404). Processing corresponding to the magnitude of the fatigue level after the update is performed (S405, S306, and S307).

According to the aforementioned second embodiment, the following advantageous effects are obtained.

(9) The on-vehicle device 10A is mounted on the vehicle 9. The on-vehicle device 10A includes the first information generation unit 11 that generates the first information which is the information on the state of the first component mounted on the vehicle by using the output of the sensor mounted on the vehicle 9, and the on-vehicle storage unit 130 that stores the accumulated values of the fatigue levels of the first component. The on-vehicle storage unit 130 further stores the fatigue limit information 35 with which the increase in the fatigue level of the first component is capable of being calculated by using the first information and the second information which is the information on the state of the second component which is the component different from the first component. The on-vehicle device 10A further includes the fatigue evaluation unit 23 that calculates the increase in the fatigue level by using the first information, the second information, and the fatigue limit information 35, and determines that the first component is in the abnormal state when the sum of the accumulated values of the fatigue levels stored in the on-vehicle storage unit 130 and the increase in the fatigue level exceeds a predetermined threshold value. Thus, the on-vehicle device 10A can obtain the same advantageous effects similar as those of the first embodiment without communicating with the server 20.

In the above-described embodiments and modification examples, the configuration of the functional block is merely an example. Some function configurations illustrated as separate functional blocks may be integrally constructed, or a configuration illustrated in one functional block diagram may be divided into two or more functions. Some of the functions of each functional block may be included in another functional block.

The aforementioned embodiments and modification examples may be combined with each other. Although various embodiments and modification examples have been described above, the present invention is not limited to these contents. Other aspects considered within the scope of the technical idea of the present invention are also included within the scope of the present invention.

REFERENCE SIGNS LIST 9 vehicle
10, 10A on-vehicle device
11 first information generation unit
12 second information generation unit
15 vehicle control unit
16 notification unit
20 server
21 stress calculation unit
22 number-of-times calculation unit
23 fatigue evaluation unit
30 server storage unit
31 component information
32 physical property value
33 vehicle database
34 stress information
35 fatigue limit information
36 insulation information
41 first information
42 second information
910 battery
911 DC power cable
920 inverter
921 smoothing capacitor
922 power module
923 IGBT
924 diode
925 AC power cable
930 motor
931 motor rotation angle detector
940 gearbox
950 accelerometer
906 drive shaft 907A, 907B, 907C, 907D brake device
908A, 908B, 908C, 908D wheel

The invention claimed is:

1. An on-vehicle device that is mounted on a vehicle to communicate with a server, the on-vehicle device comprising:
   a central processing unit (CPU) that generates first information which is information on a state of a motor mounted on the vehicle by using an output of a sensor mounted on the vehicle, and the first information further includes a voltage value applied to a coil of the motor; and
   a wireless communication interface that transmits, to the server, the first information and second information which is information on a state of a second component which is different from the motor, and receives, from the server, a state signal indicating an abnormal state of the motor calculated by the server based on the first information and the second information, and
   wherein the server calculates the abnormal state of the motor by further using an atmospheric pressure in addition to the first information and the second information.

2. The on-vehicle device according to claim 1, wherein the CPU changes a traveling state of the vehicle based on the state signal received by the wireless communication interface.

3. The on-vehicle device according to claim 1, further comprising:
   at least one of a display or speaker that notifies an occupant of the vehicle of the state signal received by the wireless communication interface.

4. The on-vehicle device according to claim 1, wherein the first information further includes an output of an accelerometer provided at a connection portion between the motor and the vehicle, and
   the second information includes a rotation speed of a drive shaft mechanically connected to the motor directly or indirectly.

5. A communication system comprising:
   a server; and
   an on-vehicle device mounted on a vehicle and communicatively coupled with the server,
   wherein the on-vehicle device includes
      a first central processing unit (CPU) that generates first information which is information on a state of a motor mounted on the vehicle by using an output of a sensor mounted on the vehicle, and the first information further includes a voltage value applied to a coil of the motor, and
      a wireless communication interface that transmits, to the server, the first information and second information which is information on a state of a second component which is different from the motor,
   the server includes a second CPU configured to
      calculate a state signal indicating an abnormal state of the motor based on the first information and the second information,
      calculate the abnormal state of the motor by further using an atmospheric pressure in addition to the first information and the second information, and
      transmit the state signal to the on-vehicle device, and
   the wireless communication interface receives the state signal.

6. The communication system according to claim 5, wherein
   the server further includes a server memory that stores
      a vehicle database which stores accumulated values of fatigue levels of motor, and
      fatigue limit information with which an increase in the fatigue levels of the motor is capable of being calculated by using the first information and the second information, and
   the second CPU calculates the increase in the fatigue levels by using the first information and the second information received from the on-vehicle device and the fatigue limit information stored in the server memory, and determines that the motor is in the abnormal state when a sum of the accumulated values of the fatigue levels stored in the server memory and the increase in the fatigue levels exceeds a predetermined threshold value.

7. The communication system according to claim 6, wherein the second CPU changes the predetermined threshold value based on the second information.

8. An on-vehicle device mounted on a vehicle, comprising:
   a central processing unit (CPU) that generates first information which is information on a state of a motor mounted on the vehicle by using an output of a sensor mounted on the vehicle, and the first information further includes a voltage value applied to a coil of the motor; and
   a memory that stores
      accumulated values of fatigue levels of the motor, and
      fatigue limit information with which an increase in the fatigue levels of the motor is capable of being calculated by using the first information and second information which is information on a state of a second component which is different from the motor, and
   wherein the CPU calculates the increase in the fatigue levels by using the first information, the second information, and the fatigue limit information, and determines that the motor is in an abnormal state when a sum of the accumulated values of the fatigue levels stored in the memory and the increase in the fatigue levels exceeds a predetermined threshold value.

* * * * *